Patented Oct. 22, 1935

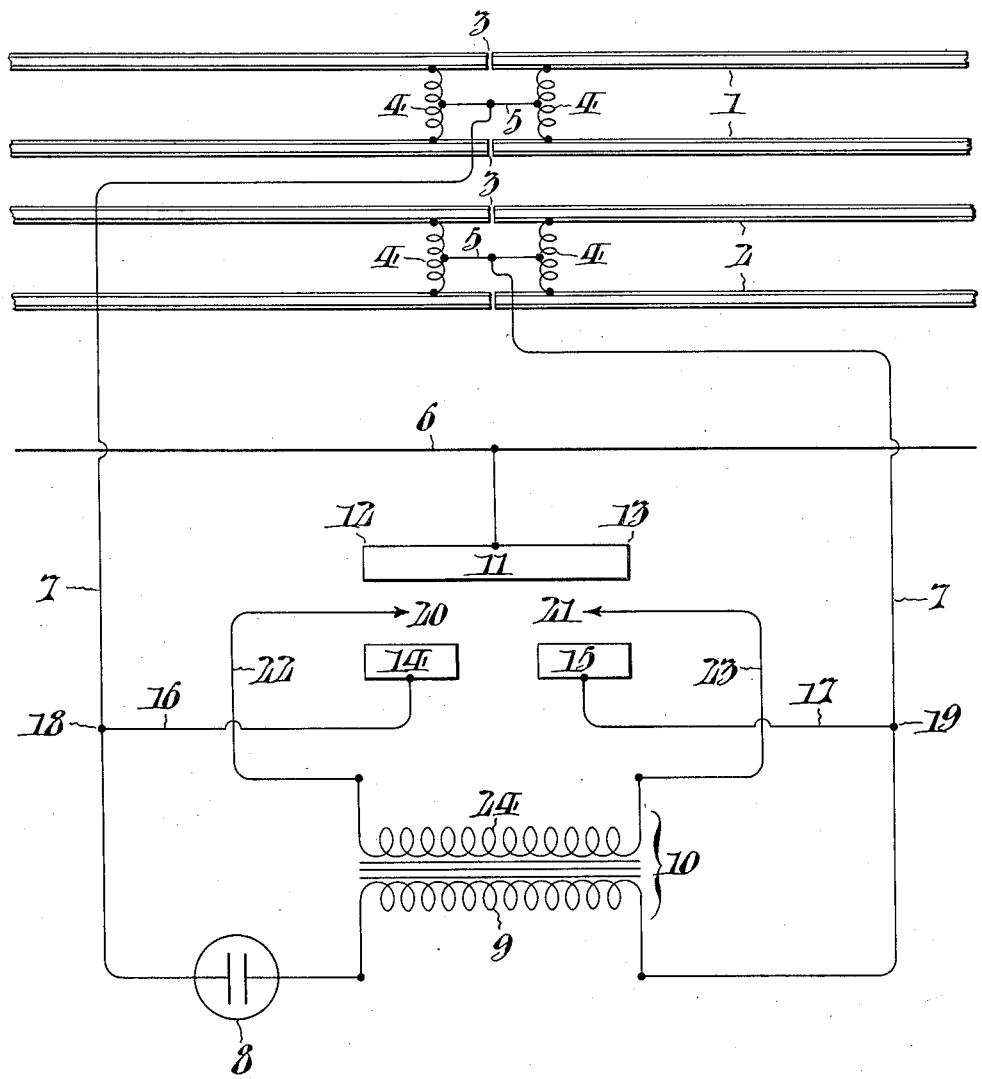

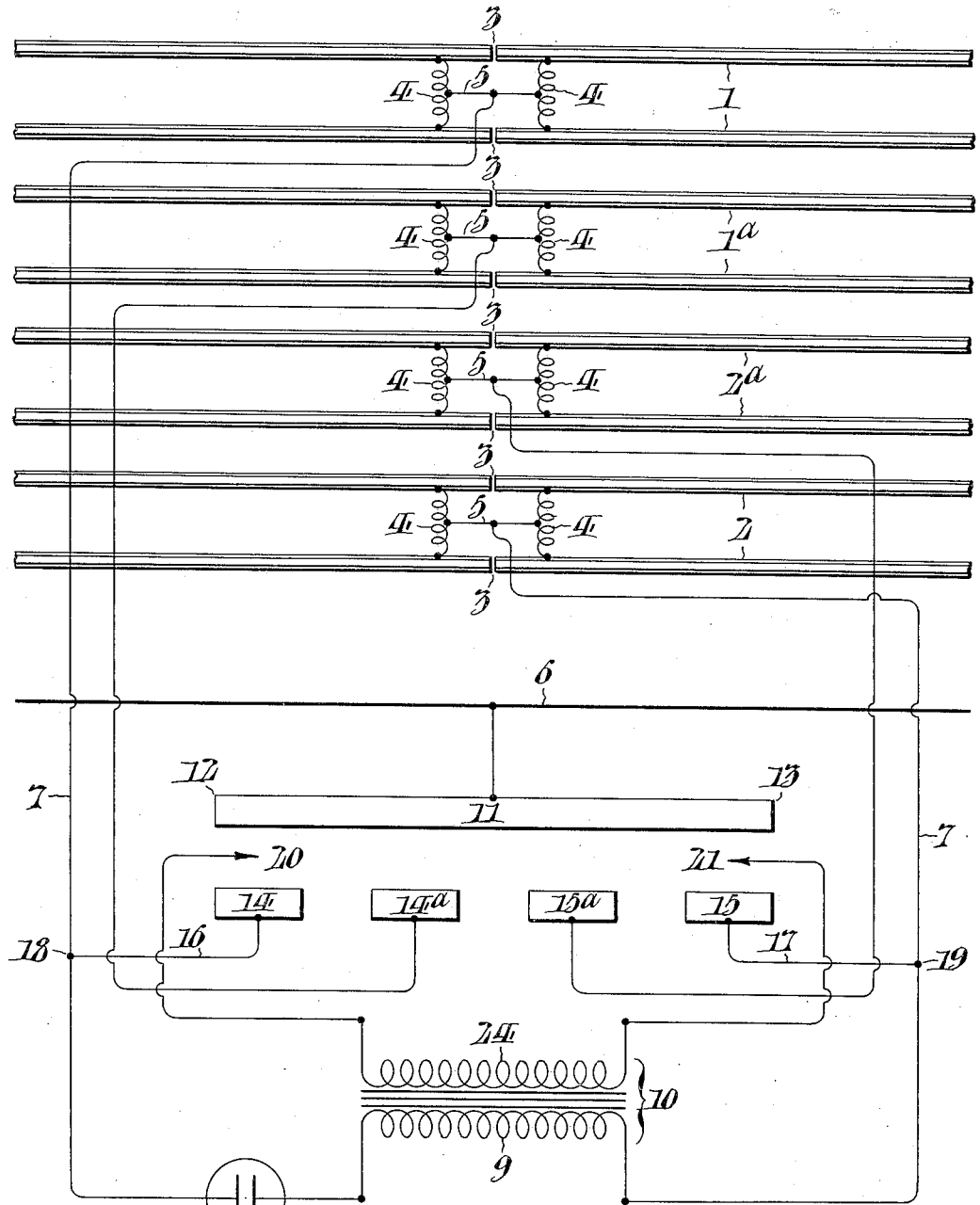

2,018,241

UNITED STATES PATENT OFFICE 2,018,241

ELECTRIC PROTECTIVE SYSTEM

Sylvester M. Viele, Swarthmore, Pa.

Application December 14, 1933, Serial No. 702,312

11 Claims. (Cl. 175—294)

This invention relates to electrical protective systems for the reduction of potential difference between a return ground conductor and adjacent grounds which may come into contact with the supply line normally associated with the return ground conductor.

In the case of a conductor which is either normally used for or may become a return ground in an electric circuit, such as a cable sheath or the rails of a track, the grounding of that circuit produces a difference of potential between the return conductor and adjacent ground conductors or the earth itself, depending upon the conditions involved. This difference of potential varies from point to point along the grounded conductors depending upon collateral factors, but generally it is greatest at a point farthest removed from the source of electrical power. If a fault or grounding occur on a circuit connected to a source of electrical energy delivering a sufficient amount of power, the difference of electrical potential between the return ground conductor and other grounds with which this fault has caused the circuits to become connected, may be great enough to cause a life hazard to one in contact with the two adjacent grounds so charged.

For example, in electrical transmission lines of an electrical railway, the tracks are customarily used for return ground conductors. If the transmission line becomes connected to an associated track or to the earth by accident, substantial difference of potential may be created between the rails of the track referred to above and adjacent rails or the earth, whichever are in contact with the deranged transmission line. For a man standing with one foot on the ground and the other foot on a rail of this track whose corresponding transmission wire is otherwise grounded, or on the step of a car on this track, there is presented a real life hazard.

The magnitude of this difference of potential is materially influenced by the impedance or resistance of the portion of the circuit which is grounded, and is approximately proportional to the amount of current flowing in the grounded portion of the circuit. Hence by bonding together the sheaths of a number of cables or a number of adjacent railroad tracks, or by connecting additional metallic paths in parallel with the normal return ground conductor, the resistance or impedance of the normal return ground conductor may be reduced, thus reducing the difference of potential between the normal return ground and the other adjacent grounds below the danger point. However, it is not always feasible to connect a group of tracks or cable sheaths together. In the case of tracks, such connection together may impair the operation of the signal system with its numerous blocks and signal break joints between blocks. In the case of cable sheaths, a connection of such nature may be undesirable owing to augmentation of an existing electrolysis condition. Further, in certain cases it may be desirable to insert an insulated joint in cable sheaths, to give a high resistance to the normal return flow of current through the sheath. This results in the high difference of potential, between the cable sheath and adjacent grounds, under the conditions described above. One difficulty with the present protective circuits employing the spark gap to give instantaneous action, is their inability to withstand the severe burden of a heavy arc, and this invention seeks to overcome this obstacle.

Accordingly, the object of this invention is to reduce this potential difference between a normal return ground conductor and other adjacent grounds to which the transmission wire may become connected in cases where its magnitude creates a life hazard or reaches a predetermined undesirable limit.

Another object of this invention is the provision of a protective system of the nature described, which will perform its function efficiently in an electric railway system without disturbing the operation of the signal system connected into the tracks with the transmission system.

Another object of this invention is the provision of a protective system of the character described above which will function almost instantaneously, as compared with the appreciable time interval necessary for the operation of the usual circuit breaker.

Another object of this invention is the provision of a protective system of the character described above which will instantly reduce a heavy potential difference without injury to the apparatus involved, and just as quickly cease operation and return the apparatus to normal condition when the potential difference is reduced.

Other objects and advantages of this invention will be apparent from the detailed description of a preferred embodiment thereof which follows and which has reference to the accompanying drawings, whereof:

Fig. I represents a diagrammatic view of apparatus embodying my invention as used with two parallel railway tracks.

Fig. II represents a diagrammatic view of apparatus embodying a modified form of my invention as used with four parallel railway tracks.

Referring particularly to Fig. I, there is shown an example of this invention as used with two parallel railway tracks 1, 2 which are partially grounded return conductors for alternating current power transmission through overhead wires (not shown).

These rails are also conductors of alternating current for a signal system which is formed into blocks by signal break joints 3 interrupting the electrical continuity. These joints or discontinuities 3 are usually bridged for the passage of traction current by impedance bonds 4, having their central portions connected by wires 5. The effect of the impedance bonds 4 connected in the manner shown is that traction current flows through the impedance bonds 4, and wire 5 around the signal break joints 3, but owing to the relatively high frequency of the signal current, only a relatively small portion of such current flows through the impedance bonds 4 from rail to rail. Thus there is provided by the same rails a continuous return conductor for the traction current and a discontinuous conductor for the signal system constituting a series of separate loops of the usual type in signal circuits on railways.

In the illustrated example of this invention, there is shown running parallel with the tracks 1, 2 a static or lighting protection ground wire 6 which may be connected to the source of power supply as another grounded return conductor. A circuit, which I conveniently term the "main circuit", connects the two tracks 1, 2 by connecting the two wires 5. In the primary branch of the main circuit, there are connected in series the conductors 7, a phanotron tube 8, which has a predetermined break-down value at which current will flow across the gap, and the primary winding 9 of a transformer 10. The phanotron tube 8 is a two electrode, cold cathode, gas discharge, voltage regulating tube which makes use of the constant voltage characteristics of gas filled tubes. While a phanotron tube 8 is preferably used here, other types of spark gaps may be used for the same purpose.

The phanotron tube 8 allows current to pass in both directions and hence is used for alternating current. If direct current is to flow in one direction only in the main circuit, the phanotron tube would obviously work, but a one-way tube or gap could be substituted for it. The break-down value of the tube 8 is selected to be well above the signal and normal traction current voltages.

To the ground wire 6 there is connected a heavy bridging member 11 to provide two contact ends 12, 13 of a size sufficient to withstand the wear and tear of a heavy arc and the necessary distance apart as will appear later. Desirably the bridging member 11 takes the form of a plate to withstand the burden of a heavy arc. If the protective system is to be used to simply reduce the potential between tracks 1, 2, it is apparent that the ground wire 6 may be eliminated without departing from the principle and spirit of this invention.

Opposite each end 12, 13 of the bridging member 11 is placed a contact plate 14, 15. These contact plates 14, 15 are connected to the conductors 7 by wires 16, 17, respectively, the points of connection 18, 19 being separated by the tube 8 and the transformer winding 9. The circuit thus established between the conductors 7, and including the wires 16, 17 and plates 14, 15 is conveniently termed a "shunting" circuit.

Between the plates 14, 15 and the respective ends 12, 13 of the bridging member 11 are placed arcing terminals 20, 21, which are connected by wires 22, 23 to the ends of the secondary winding 24 of the transformer 10, and these elements constitute the secondary branch of the main circuit. The arcing terminals 20, 21 are so spaced and the ratio of transformer 10 is so selected that when the tube 8 breaks down and current flows through the transformer 10, an arc is produced from terminals 20, 21 to the respective ends 12, 13 of the bridging plate 11, forming a circuit through the secondary winding 24, and ionizing the spaces between contact plates 14, 15 and the respective ends 12, 13 of the bridging member 11. The contact plates 14, 15 have been so spaced in relation to the bridging member 11 that such ionization permits the non-transformed difference of potential between tracks 1, 2 and the ground wire 6 to bridge the gaps between plates 14, 15 respectively, and the bridging member 11, thus setting up the flow of current in the shunting circuit.

The main burden from the abnormal potential difference is at once taken care of between the plates 14, 15 and the bridging member 11, shunting out that part of the main circuit which contains the tube 8 and the transformer 10, and relieving these more delicate elements from the destructive forces of the heavy arcing incident to the main burden of the abnormal conditions. The main circuit thus acts as a piloting circuit which is delicate enough to accurately prepare the heavy duty shunting circuit to take the main burden of abnormal conditions. The use of the main circuit, involving the tube 8 and transformer 10, makes it possible to provide comparatively wide gaps between plates 14, 15, respectively, and the bridging member 11, which avoids the tendency of two closely spaced contacts subject to a heavy arc in the open air to fuse together. Once the gap is bridged by the heavy arc through the aid of the ionization between plates 14, 15, respectively, and the bridging member 11, the heavy duty shunting circuit sustains itself until the abnormal condition is removed, or the circuit de-energized.

Under these conditions tracks 1, 2 and the ground wire 6 are multiplied together to form parallel return paths for current under abnormal conditions, and such paths have a much lower impedance or resistance than does either track 1 or 2. Consequently, a material reduction is made in the difference of potential which may exist between the normal return ground conductor and points on the ground adjacent to this track.

With the opening of the circuit breaker (not shown) in the traction circuit wherein the abnormal condition exists the previously established arcs between plates 14, 15, respectively, and the plate 11 are extinguished by reason of the cessation of current flow through the main circuit and the consequential cessation of current flow through winding 24 of the transformer 10, and the two arcing contacts 20, 21 and the plate 11. This restores the traction circuit and the signal circuits to normal condition at once, and the equipment is ready again for functioning in the manner described. The operation of this invention has been completely described in relation to the structure.

This invention is obviously applicable to situations involving more than two conductors by the simple expedient of dividing the conductors into two groups and connecting this invention to these two groups as in the case of two single conductors.

Fig. II of the drawings shows another way of applying this invention to more than two conductors by providing an extra contact plate 14a and 15a like plates 14 and 15, each connected to an extra conductor 1a and 2a, respectively.

These extra contact plates 14a and 15a are placed adjacent plates 14 and 15 and spaced from the bridging member 11 in the same manner as are plates 14 and 15. In the particular embodiment shown in Fig. II, these extra contact plates 14a and 15a are placed between plates 14 and 15, but this particular order is not important in itself so long as the extra plates 14a and 15a are placed in such relation to the plates 14 and 15 that the ionization between plates 14 and 15, and bridging member 11, spreads to the spaces between plates 14a and 15a, and bridging member 11. Each contact plate is spaced from adjacent contact plates by a distance sufficient to prevent arcing between contact plates instead of from contact plate to bridging member 11. The effect of these extra plates 14a and 15a as connected to additional conductors 1a and 2a as explained above is to add these additional conductors 1a and 2a to conductors 1, 2 and ground wire 6 as return conductors, thereby reducing the resistance or impedance of the normal return ground conductor of the faulted circuit. Suppose a transmission wire accidentally comes into contact with conductor 1. Current then flows across the gaps between plates 14 and 15 and bridging member 11 as described above in relation to the apparatus shown in Fig. I. The ionization from the sparks in the gaps between the plates 14 and 15 and bridging member 11 spreads to the gaps between extra plates 14a and 15a, respectively, and the bridging member 11, permitting current to flow from the bridging member 11 to these extra plates 14a and 15a, and thence through the additional conductors 1a and 2a This embodiment of my invention, as shown in Fig. II, has a further advantage in case a transmission wire should come into contact with one of the additional conductors 1a or 2a, in that the apparatus may operate to reduce the difference of potential between this additional conductor 1a or 2a and adjacent return conductors. This operation is described as follows. Suppose a transmission wire accidentally came into contact with additional conductor 2a. As all these conductors 1, 2, 1a and 2a, are partially grounded, current will leak to adjacent conductor 2 and flow through the apparatus as described above, setting up arcs between plates 14 and 15, respectively, and bridging member 11 which ionizes the spaces between 14a and 15a and bridging member 11. Current then flows from conductor 2a directly to the bridging member 11 and through the other conductors as multipled return conductors, thereby reducing the potential difference as explained above.

It has been found that this invention quickly reduces the potential difference between a normal return ground conductor and adjacent grounds, thus eliminating the danger to persons during the interval required for circuit breaker action, and that the equipment is instantly restored to normal condition as soon as this protective circuit has fulfilled its function. The invention is particularly adapted to electrified railways having signal circuits in addition to the power transmission connected to the rails, and where abnormal conditions of this nature are likely to involve high power and heavy forces.

While this invention has been described in some detail with reference to a specific embodiment, various changes in the form of apparatus used are within the contemplation of the invention and such changes should not be deemed to constitute a departure from the spirit of the invention as hereinafter claimed. As has been suggested above, this invention has obvious application generally in relation to electric circuits and is not restricted to electric railways and cable sheathings.

Having thus described my invention, I claim:

1. In combination with a plurality of conductors, an electrical protective system comprising a circuit connecting said conductors and having a gap of predetermined breakdown value therein, and piloting means actuated by said circuit when energized for ionizing the space in said gap to set up an arc therein completing the circuit and thereby reducing the potential difference between said conductors.

2. In combination with a plurality of conductors, an electrical protective system comprising a normally open circuit connecting said conductors and including a gap of predetermined breakdown value therein, a second normally open circuit shunting said first circuit and including a gap of higher breakdown value than the gap of said first circuit, and means whereby current flowing in said first circuit is caused to ionize the gap of the second circuit, thereby permitting current flow in said second circuit and reducing the potential difference between said conductors.

3. In combination with a plurality of conductors, an electrical protective system comprising a normally open circuit connecting said conductors and including a gap of predetermined breakdown value therein, a second normally open circuit shunting said first circuit and including a gap of higher breakdown value than the gap of said first circuit, and means whereby current flowing in said first circuit is raised to a higher electrical potential and utilized to ionize the gap of the second circuit, thereby permitting current flow in said second circuit and reducing the potential difference between said conductors.

4. In combination with a plurality of conductors, an electrical protective system comprising a normally open circuit connecting said conductors and including a gap of predetermined breakdown value therein, a second normally open circuit shunting said first circuit and including a gap of higher breakdown value than the gap of said first circuit, a ground connection associated with said gap to connect said second circuit with the ground through an arc in said gap, and means whereby current flowing in said first circuit is caused to ionize the gap of the second circuit, thereby permitting current flow in said second circuit and reducing the potential difference between said conductors and the ground.

5. In combination with a plurality of conductors, an electrical protective system comprising a normally open circuit connecting said conductors and including primary and secondary branches, the primary branch of said circuit having a gap of predetermined breakdown value, a second normally open circuit shunting said first circuit and including a gap of higher breakdown value than the gap of said first circuit, and an arcing terminal connected to the secondary branch of said first circuit and disposed within said gap whereby current flowing in said first circuit is caused to ionize the gap of the second circuit, thereby permitting current flow in said second circuit and reducing the potential difference between said conductors.

6. In combination with a plurality of conductors, an electrical protective system comprising a normally open circuit connecting said conductors and including primary and secondary branches, the primary branch of said circuit having a gap of predetermined breakdown value and being connected to said secondary branch by a transformer, and a second normally open circuit shunting said first circuit and including a gap of higher breakdown value than the gap of said first circuit, and arcing terminals connected to the secondary branch of said first circuit and disposed within said gap whereby current flowing in said first circuit is caused to ionize the gap of the second circuit thereby inducing current flow in said second circuit and reducing the potential difference between said conductors.

7. In combination with a plurality of conductors, an electrical protective system comprising a circuit connecting said conductors and including a tube of predetermined breakdown value and the primary winding of a transformer, spaced contact plates connected to said circuit at points separated by said tube and transformer, a bridging member connected to the ground and spaced at a predetermined distance from each said contact plate, and arcing terminals disposed between each said contact plate and the bridging member, said arcing terminals being connected to opposite ends of the secondary winding of the transformer.

8. In combination with a plurality of conductors, an electrical protective system comprising a circuit connecting said conductors and including a tube of predetermined breakdown value and the primary winding of a transformer, spaced contact plates connected to said circuit at points separated by said tube and transformer, a bridging member spaced at a predetermined distance from each said contact plate, a ground wire connecting to the source of power with said other conductors, and said bridging member, and arcing terminals disposed between each said contact plate and the bridging member, said arcing terminals being connected to opposite ends of the secondary winding of the transformer.

9. In combination with a plurality of conductors having discontinuities therein which are bridged by impedance bonds, an electrical protective system comprising a circuit connecting the central portions of an impedance bond of each said conductors, and having a gap therein of predetermined breakdown value, and piloting means actuated by said circuit when energized for ionizing the space in said gap to permit the setting up of an arc in said gap, completing the circuit when the difference of potential between said conductors has reached a predetermined point below the breakdown value of said gap.

10. In combination with a plurality of conductors, an electrical protective system comprising a bridging member, an electrical contact plate attached to each said conductor, each said plates being spaced from said bridging member to provide gaps of predetermined breakdown value, and means actuated by said circuit when energized for ionizing the spaces in said gaps to permit the setting up of arcs in said gaps completing a circuit when the difference of potential between said conductors has reached a predetermined point below the breakdown value of said gaps.

11. In combination with a plurality of grounded conductors, an electrical protective system comprising a circuit connecting two of said conductors, and including a tube of predetermined breakdown value and the primary winding of a transformer, spaced contact plates connected to said circuit at points separated by said tube and transformer, each of said contact plates being connected to one of said conductors, a bridging member spaced at a predetermined distance from each said contact plates, and arcing terminals disposed between each end contact plate and the bridging member, said arcing terminals being connected to opposite ends of the secondary winding of the transformer.

SYLVESTER M. VIELE.